March 6, 1962 R. H. SWARTZ 3,023,812
ANIMAL HOOF ATTACHMENT
Filed Feb. 11, 1960
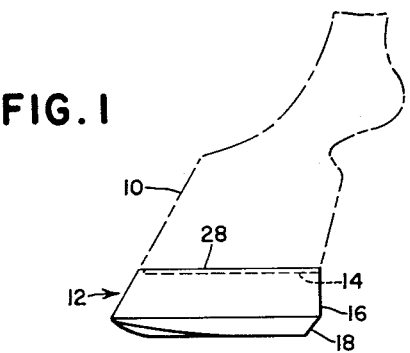
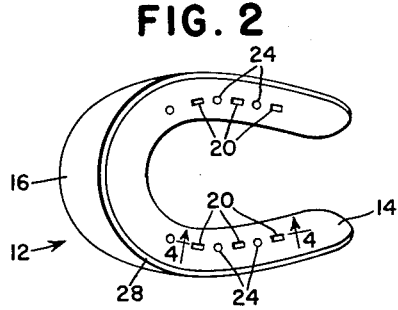
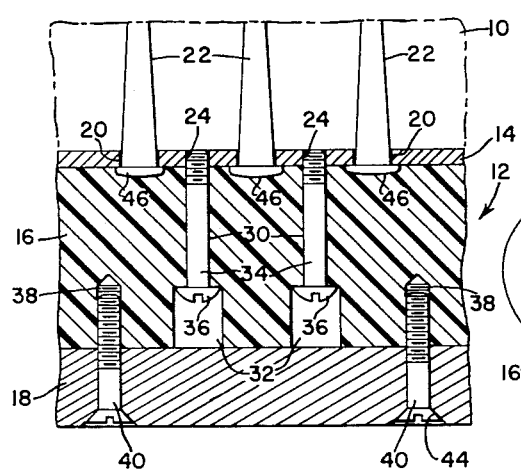
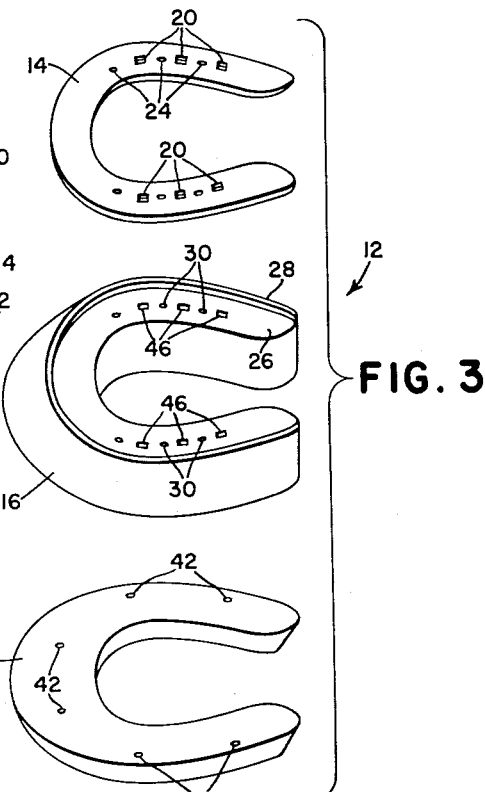
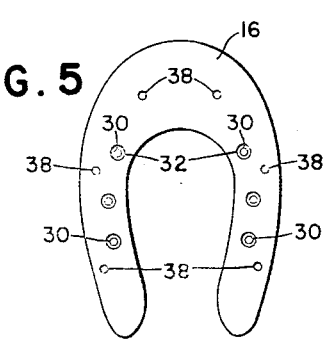
INVENTOR.
R. H. SWARTZ
ATTORNEY

# United States Patent Office 3,023,812
Patented Mar. 6, 1962

3,023,812
ANIMAL HOOF ATTACHMENT
Russell H. Swartz, 3629 Jersey Ridge Road,
Davenport, Iowa
Filed Feb. 11, 1960, Ser. No. 8,168
8 Claims. (Cl. 168—23)

This invention relates to an attachment for the hoof of a horse or like animal and has for its principal object the provision of an extension or equivalent block for increasing the length of the animal's hoof.

The invention finds particular utility as an extension for the purpose described, which is an expedient in improving the exhibition characteristics of animals, in the first place by improving the appearance of their hooves and in the second place by causing them to move their feet properly according to the particular gait. More particularly, the extension adds not only length but a certain amount of weight which improves the action of the animal's feet and legs. In the past, these results were sought to be achieved by allowing the hoof to grow longer, but this had the disadvantage that the hoof would split and become misshapen. Other expedients utilize layers of leather and like material between the undersurface of the hoof and the iron shoe, but this proved to be unsuitable because the leather was not stable enough in a lateral direction and furthermore required the use of extremely long nails which in turn contributed to the lateral instability. The use of built-up iron shoes resulted in the addition of too much weight.

According to the present invention, these disadvantages are eliminated by the provision of a relatively rigid extension block formed of non-metallic material, preferably nylon or other material of the class including polyethylene. It is a further object of the invention to provide improved means for attaching this block to the undersurface of the hoof, together with means for attaching a conventional iron shoe to the undersurface of the block. It is an important object of the invention to utilize as material for the block such material that can be dressed and shaped according to the animal's hoof and one which can be dressed and shaped while in place on the animal. Another object is to provide mounting means which may be easily manipulated to provide for the ready removal of the block from the animal.

The foregoing and other important objects and desirable features inherent in and encompassed by the invention will become apparent to those versed in the art as a preferred embodiment of the invention is disclosed, by way of example, in the ensuing description and accompanying sheet of drawings, the several figures of which are described below.

FIGURE 1 is an elevation, partly schematic, showing the attachment means in place on the hoof of a horse.

FIGURE 2 is a plan view of the attachment means.

FIGURE 3 is an exploded perspective of the components of the attachment means.

FIGURE 4 is an enlarged section as would be seen generally along the line 4—4 of FIGURE 2.

FIGURE 5 is a bottom view of the attachment block.

Broken lines in FIGURE 1 represent the lower portion of the leg of a hourse or like animal, which leg terminates in a hoof 10 to which the attachment means, designated in its entirety by the numeral 12, is applied.

The attachment means comprises essentially three major components; namely, a mounting plate 14, a block 16 and a shoe 18; although, the attachment means may be used without the shoe if desired. The plate 14 is a metal plate of C-shape, or having generally the configuration of a conventional horse shoe. It is relatively thin and is provided with a plurality of rectangular holes 20 through which conventional horse shoe nails may be driven to mount the plate to the undersurface of the hoof 10. The holes 20 represent a first set of apertures and the horse shoe nails, shown at 22 in FIGURE 4, represent a first set of fastener means.

The plate 14 also includes a second set of apertures, here a plurality of tapped holes 24, alternated with the first set of apertures as best seen in FIGURES 2 and 3.

The upper surface of the block 16 is generally congruent with and is adapted to abut the undersurface of the plate 14, with the exception that the upper surface of the block is recessed at 26, so as to provide on the block an outer peripheral or marginal upstanding rib or ridge 28, the depth of the recess 26 being substantially on the order of the thickness of the plate so that the plate 14 is recessed in the upper surface of the block and in final assembly (FIGURE 1) the plate is concealed by the rib or ridge 28 from being visible externally of the structure.

The shape of the block 16 is such that it may be regarded as an extension of the hoof 10, and therefore has a downwardly and outwardly diverted shape as illustrated, whereby its undersurface is of course of greater area than the upper surface in which the recess 26 is formed. The undersurface is flat and serves to receive the upper surface of the shoe 18. The block is provided with a plurality of vertical apertures 30, each of which opens downwardly as a counterbore 32, and each aperture is adapted to receive a threaded fastener 34 having its head 36 recessed in or accommodated by the associated counterbore or recess 32. In assembly, the plate 14 is first fitted to and mounted on the hoof by the nails 22 or equivalent fasteners, following which the block is secured to the under side of the plate 14 by the fasteners 34.

In addition to the apertures or bores 30, the block 16 has therein a plurality of tapped bores 38 for respectively receiving a plurality of fasteners in the form of screws 40 passed upwardly through appropriate apertures 42 in the shoe 18. The fasteners illustrated are flat-head screws having their heads received in countersunk recesses 44 in the bottom of the shoe (FIGURE 4).

As will be seen, the attachment means is capable of being readily assembled and disassembled. The application of the plate 14 to the hoof 10 utilizes, or may utilize as illustrated, conventional nails at 22, the significant thing being that the plate serves as a foundation for attachment of the block 16 which may be readily attached as by means of the screws 34 as described. When the shoe 18 is used, it may be readily attached to the block 16 as by the screws 40. As indicated, the block 16 is of material capable of being shaped and dressed with the same tools that are used to shape and dress the hoof 10 and if desired, may be painted the same color as the hoof, or may be furnished originally in a neutral color, thus lending a variety of possibilities from the appearance standpoint. From the structural standpoint, the block 16 is light in weight, having a relatively low specific gravity and it being relatively rigid so as to possess considerable lateral and vertical stability. Another characteristic of the material is that it is unaffected by dirt and moisture and furnishes just the right amount of additional weight for its size, as compared, for example, with a block of metal such as aluminum. The material is capable of being readily drilled and tapped so that it lends itself to attachment by the fastener means illustrated.

The block 16 may be provided in several heights. Not only may it be used to supplement a normal hoof but it can be provided in selective thicknesses and added to a hoof that has lost height or length because of injury, etc.

Since the plate 14 is relatively thin, it is found expedient not to countersink the holes 20 for the nails 22 and accordingly the upper surface of the block 16 may be provided with a plurality of small recesses at 46 for accommodating the heads of the nails (FIGURE 4). Features and advantages of the invention, other than those categorically enumerated herein, will readily occur to those versed in the art, as will many modifications and alterations in the preferred embodiment illustrated, all of which may be achieved without departure from the spirit and scope of the invention.

What is claimed is:

1. An extension attachment for the hoof of a horse or like animal for increasing the height of the hoof and thus to improve the exhibition characteristics of the animal, comprising: a C-shaped member of relatively thin substantially rigid material adapted to lie substantially congruent with and flatwise against the undersurface of the hoof and having a first set of holes therein for receiving nails driven upwardly into the hoof, and a second set of apertures comprising a plurality of downwardly opening tapped openings; an extension block of substantial height and of C shape to conform generally to the shape of said plate, said block having upper and lower surfaces and arranged with its upper surface generally congruent with and flatwise against the undersurface of said plate and said block having therein a plurality of vertical holes respectively in vertical register with said tapped openings, each of said vertical holes having a counterbore at the lower surface of said block, said block being of relatively rigid material having substantial vertical and lateral stability against compression and distortion, and said lower surface of said block being of greater area than its upper surface to give said block a downwardly diverging shape whereby to extend the shape of the hoof, and the material of said block being capable of being dressed to improve its characteristics as a hoof extension; a plurality of screws passed upwardly respectively through said vertical holes and threaded into the tapped openings, each screw having a head received in the respective counterbore; a C-shaped shoe generally congruent with and lying flatwise against the lower surface of the block; and removable fastener means securing the shoe to the block.

2. The invention defined in claim 1, in which: the upper surface of the block is recessed in an amount substantially equal to the thickness of the plate and thereby having a peripheral upstanding ridge for meeting the marginal portion of the hoof so as to conceal the plate.

3. The invention defined in claim 1, in which: the block is of one-piece construction and is composed of relatively rigid light-weight non-metallic material.

4. The invention defined in claim 3, in which: the material is of the class including polyethylene.

5. An extension attachment for the hoof of a horse or like animal for increasing the height of the hoof and thus to improve the exhibition characteristics of the animal, comprising: a C-shaped member of relatively thin substantially rigid material adapted to lie substantially congruent with and flatwise against the undersurface of the hoof and having a first set of holes therein for receiving first fastener means engaging the hoof, and a second set of apertures opening downwardly; an extension block of substantial height and of such shape as to conform generally to the peripheral outer shape of said plate, said block having upper and lower surfaces and arranged with its upper surface generally congruent with and flatwise against the undersurface of said plate and said block having therein a plurality of vertical holes respectively in vertical register with said second set of apertures, said block being of relatively rigid material having substantial vertical and lateral stability against compression and distortion, and said lower surface of said block being of greater area than its upper surface to give said block a downwardly diverging shape whereby to extend the shape of the hoof, and the material of said block being capable of being dressed to improve its characteristics as a hoof extension; a plurality of second fasteners passed upwardly respectively through the vertical holes and into the second set of apertures; a C-shaped shoe generally congruent with and lying flatwise against the lower surface of the block; and removable fastener means securing the shoe to the block.

6. The invention defined in claim 5, in which: the upper surface of the block is recessed in an amount substantially equal to the thickness of the plate and thereby having a peripheral upstanding ridge for meeting the marginal portion of the hoof so as to conceal the plate.

7. An extension block for increasing the length of the hoof of a horse or like animal for increasing the height of the hoof and thus to improve the exhibition characteristics of the animal, comprising: a one-piece C-shaped element of substantial height having an upper surface mountable on the undersurface of the hoof and further having a lower surface for receiving a shoe, said block having a plurality of vertical fastener-receiving holes therein, said block being of relatively rigid material having substantial vertical and lateral stability against compression and distortion, and said lower surface of said block being of greater area than its upper surface to give said block a downwardly diverging shape whereby to extend the shape of the hoof, and the material of said block being capable of being dressed to improve its characteristics as a hoof extension.

8. The invention defined in claim 7, in which: the upper surface of the block has an outer peripheral ridge upstanding therefrom.

References Cited in the file of this patent

UNITED STATES PATENTS

| | | |
|---|---|---|
| 142,590 | Smith | Sept. 9, 1873 |
| 219,944 | Hoffman | Sept. 23, 1879 |
| 514,934 | Jones | Feb. 20, 1894 |
| 2,266,575 | Treece | Dec. 16, 1941 |
| 2,855,705 | Goodman | Oct. 14, 1958 |